United States Patent [19]
Ryoki et al.

[11] Patent Number: 5,112,169
[45] Date of Patent: May 12, 1992

[54] THREAD CUTTING METHOD AND APPARATUS

[75] Inventors: Masato Ryoki; Kenji Ito, both of Ooguchi, Japan

[73] Assignee: Kabushiki Kaisha Okuma Tekkosho, Aichi, Japan

[21] Appl. No.: 701,330

[22] Filed: May 9, 1991

Related U.S. Application Data

[63] Continuation of Ser. No. 520,658, May 10, 1990, abandoned.

Foreign Application Priority Data

May 10, 1989 [JP] Japan ................. 1-116823

[51] Int. Cl.⁵ .................. B23C 3/34; B23B 1/00
[52] U.S. Cl. ...................... 409/66; 82/1.11; 364/474.33; 409/69
[58] Field of Search ............ 409/66, 69, 65, 67, 409/68; 82/110, 1.11, 118; 318/569, 571; 364/474.33, 474.32

[56] References Cited

U.S. PATENT DOCUMENTS

| | | | |
|---|---|---|---|
| 3,854,353 | 12/1974 | Cutler | 82/110 X |
| 4,025,764 | 5/1977 | Tack | 82/110 X |
| 4,173,786 | 11/1979 | Kuhnell | 409/69 X |

Primary Examiner—William Briggs
Attorney, Agent, or Firm—Wenderoth, Lind & Ponack

[57] ABSTRACT

In the thread cutting method according to the present invention, the cutting amount S in each of the thread cutting operations from the second thread cutting operation to the $(N-1)$th thread cutting operation can be made less than and closest to the allowable cutting amount $S_p$ in each of the thread cutting operations by respectively determining as the cutting amount $S_1$ in the first thread cutting operation and the cutting amount $S_n$ at a cutting depth which corresponds to the bottom of thread the values which are less than and closest to the allowable cutting amount $S_p$ obtained at the two cutting depths. In consequence, wear of the tool can be reduced and the time required for the thread cutting process can be shortened while the thread cutting accuracy can be maintained high by determining either of two equations from the prerequisites and the processing conditions and then by designating the equation to be adopted.

4 Claims, 5 Drawing Sheets

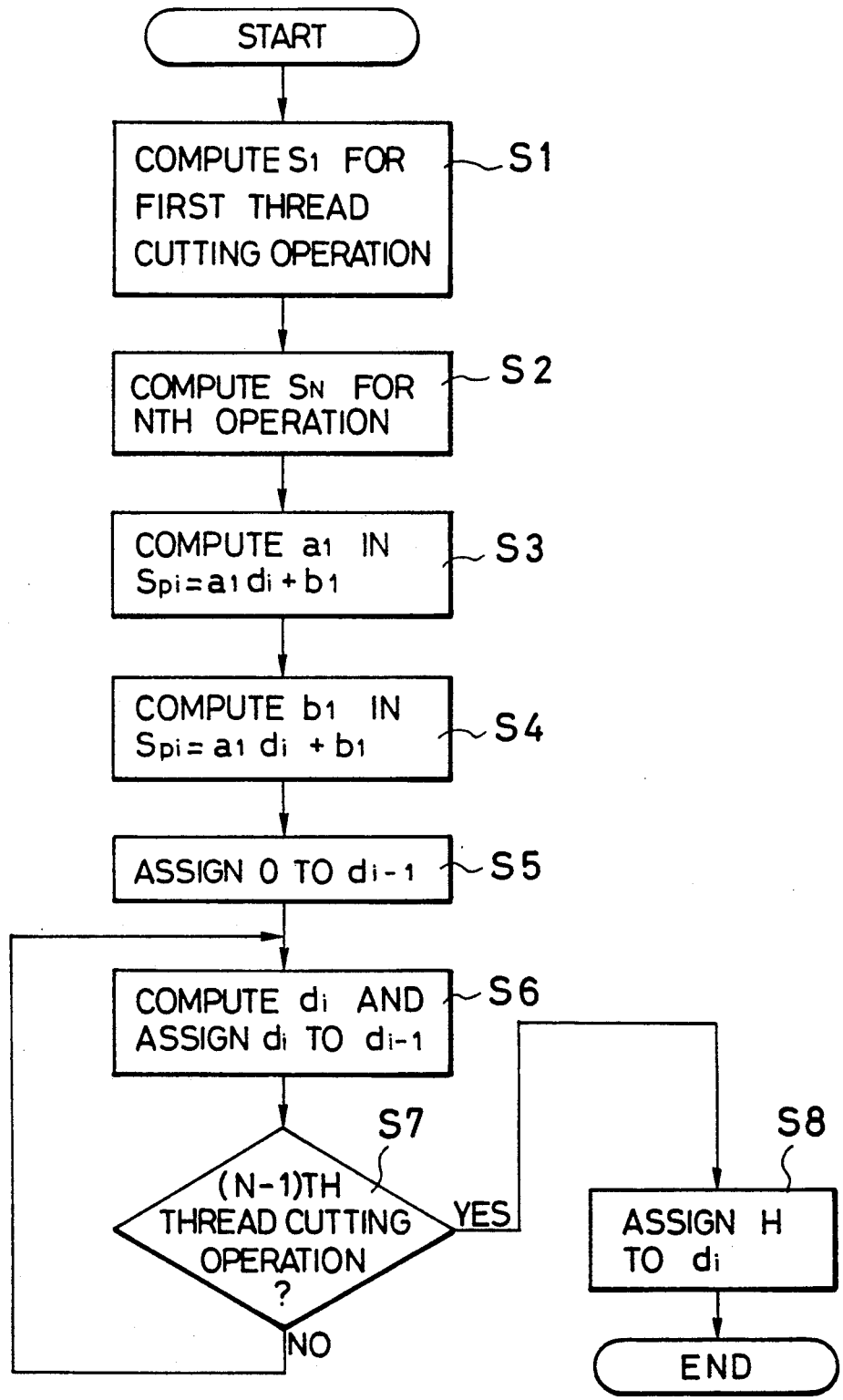
F I G. 4

THREAD CUTTING METHOD AND APPARATUS

This application is a continuation of now abandoned application, Ser. No. 07/520,658 filed on May 10, 1990.

BACKGROUND OF THE INVENTION

1. Field of the Invention

The present invention relates to a thread cutting method and a thread cutting cycle generating apparatus. More particularly, the present invention pertains to a thread cutting method which achieves reduction in wear of a tool and in the time required for the process in a so-called thread cutting cycle, as well as a high thread cutting accuracy, and a processing program generating apparatus for generating a thread cutting cycle which employs such a thread cutting method.

2. Description of the Prior Art

In a conventional processing program generating apparatus or a numeral control apparatus (hereinafter simply referred to as "an apparatus") for generating a thread cutting cycle, an intermediate tool path is automatically determined and a thread cutting cycle is thereby generated only by giving commands shown in FIG. 1, including the finished form such as a height of crest of thread H, a cutting depth D from the crest of thread in a first thread cutting operation, and an infeed U at the bottom of thread.

If the cutting depth from the crest of thread in each cutting operation in the thread cutting cycle is d, the cutting depth from the crest of thread in the first cutting operation is $d_1$, the cutting depth is in the second cutting operation $d_2$, and the cutting depth in the Nth cutting operation is $d_N$, and if the infeed in each cutting operation in the thread cutting cycle is $\Delta d$, the infeed in the first cutting operation is $\Delta d_1$, the infeed in the second cutting operation is $\Delta d_2$, and the infeed in the Nth cutting operation is $\Delta d_N$, $$d_1 = \Delta d_1, \quad d_2 = d_1 + \Delta d_2, \quad d_N = d_{N-1} + \Delta d_N \quad (1)$$

The conventional thread cutting method is roughly classified into the equal depth cutting method in which thread cutting is performed on the basis of the relationship expressed by $\Delta d_1 = \Delta d_2 = \ldots \Delta d_N$, and the gradually decreasing depth cutting method in which thread cutting is performed on the basis of the relationship expressed by $\Delta d_1 > \Delta d_2 > \ldots \Delta d_N$. This gradually decreasing depth cutting method is in turn divided into the thread cutting method (hereinafter referred to as "the first thread cutting method") in which the cutting amount in each cutting operation is maintained essentially constant, i.e., in which, if the cutting depth from the crest of thread in the first cutting operation is $d_1$, the cutting depth from the crest of thread in the second cutting operation is $d_2$, and the cutting depth from the crest of thread in the Nth cutting operation is $d_N$, the thread cutting is conducted on the basis of the relation expressed by $$d_2 = \sqrt{2}\, d_1, \quad d_3 = \sqrt{3}\, d_1, \quad d_N = \sqrt{N}\, d_1 \quad (2)$$

and the thread cutting method (hereinafter referred to as "the second thread cutting method") in which the infeed $\Delta d$ in each cutting operation is maintained at a predetermined value or above and is reduced to the predetermined value when the number of thread cutting operations are increased (see, for example, Japanese Patent Publication No. 39250/1984).

In order to achieve a reduction in the time required for the thread cutting based on the thread cutting cycle, a cutting amount which is cut out in each thread cutting operation must be made as large as possible. However, the cutting amount in each thread cutting operation cannot be increased to a predetermined value or above due to the cutting conditions (hereinafter referred to as "prerequisites"), including the shape and material of a workpiece, the shape and material of a tool, a cutting resistance, a thread cutting accuracy and wear of the tool. If this predetermined value is an allowable cutting amount $S_p$, the allowable cutting amount $S_p$ and the length l of a cutting edge used in each thread cutting operation have the following relationship ($l_1$ in FIG. 1 indicates the length of the cutting edge employed for the first thread cutting operation), $$S_p = a_1' \cdot l + b_1 \quad (3)$$

or, practically, $$S_p = a_2' \cdot l^2 + b_2 \quad (4)$$

where $a_1'$, $a_2'$, $b_1$ and $b_2$ are constants. In a normal thread cutting process, $a_1'$ or $a_2'$ in the equations (3) and (4) is often a positive value because of the prerequisites and the conditions, including rotation of a spindle and feeding speed (hereinafter referred to as "processing conditions"), and the equations (3) and (4) indicate that the allowable cutting amount $S_p$ increases in proportion to the length l of the cutting edge or the square root of the length l of the cutting edge. In a case where chatter occurs during the process, $a_1'$ or $a_2'$ in the equations (3) and (4) is a negative value. However, the equations (3) and (4) are effective, as in the former case, and indicate that the allowable cutting amount $S_p$ decreases in proportion to the length l of the cutting edge or the square root of the length l of the cutting edge.

As will be seen from the foregoing description, reduction in the time required for the thread cutting process based on the thread cutting cycle can be achieved if a thread cutting method, in which the cutting amount S can be a value which is less than and closest to the allowable cutting amount $S_p$, given by the equation (3) or (4), is adopted. However, it is impossible in the conventional thread cutting methods for the cutting amount S to be a value which is less than and closest to the allowable cutting amount $S_p$ for the following reasons:

That is, in the equation (3) or (4), since the length l of the cutting edge and the cutting depth d from the crest of thread in each thread cutting operation in the thread cutting process have the following relationship:

$$l = k\, d \quad (k:\ \text{constant},\ k > 0) \quad (5)$$

if $a_1 = a_1'k$, and $a_2 = a_2'k_2$, we can reexpress equations (6) and (7)

$$S_p = a_1 d + b_1 \quad (6)$$

$$S_p = a_2 d^2 + b_2 \quad (7)$$

FIG. 2 is a graph in which the abscissa axis represents the cutting depth d while the ordinate axis represents the cutting amount S. In FIG. 2, a straight line p-q represents the relationship between the allowable cutting amount $S_p$ and the cutting depth d, expressed by the equation (6). In that case, the allowable cutting amount $S_p = f(d)$, where $f(d) = a_1 d + b_1$. The letter H represents the height of crest of thread. A straight line r-t indicates how the cutting amount, expressed by $S = g(d)$, changes in the equal depth cutting method as the cutting depth d changes from $D_1$, the cutting depth in the first thread cutting operation, to H. The cutting depth $D_1$ in the first thread cutting operation is determined such that the cutting amount, $g(H)$, obtained when the cutting depth d is equal to H does not exceed the allowable cutting amount $S_p$ ($S_p = f(H)$ obtained when the cutting depth d is equal to H, and the thus obtained value is given as a command. A straight line u-w indicates how the cutting amount, expressed by $S = h(d)$, changes in the first thread cutting method as the cutting depth d changes from $D_2$, the cutting depth in the first thread cutting operation, to H. The cutting depth $D_2$ in the first thread cutting operation is determined such that the cutting amount, $h(D_2)$, obtained when the cutting depth d is equal to $D_2$ is equal to the allowable cutting amount $S_p$ ($S_p = f(D_2)$) obtained when the cutting depth d is equal to $D_2$, and the thus obtained value is given as a command. A straight line u-v-t indicates how the cutting amount changes in the second thread cutting method as the cutting depth d changes from $D_2$, the cutting depth in the first thread cutting operation, to H. The cutting depth $D_2$ in the first thread cutting operation is determined in the same manner as in the first thread cutting method. Also, the portion u-v represents the portion of the cycle in which the infeed $\Delta d$ is not reduced to a fixed value, as in the first thread cutting method, and the portion v-t represents the portion of the cycle in which the infeed $\Delta d$ is reduced to a fixed value, as in the depth cutting method.

As stated earlier, in order to achieve a reduction in the time required for thread cutting process based on the thread cutting cycle, the cutting amount must be a value which is less than and closest to the allowable cutting amount $S_p$, given by the equation (3) or (4), i.e., the equation (6) or (7). That is, a thread cutting method, in which the cutting amount S takes a form which is closest to that represented by the straight line p-q shown in FIG. 2, must be adopted. However, in either the equal depth cutting method represented by the straight line r-t, the first thread cutting method represented by the straight line u-w, and the second thread cutting method represented by the straight line u-v-t, it is impossible for the cutting amount to have a form which is closest to that represented by the straight line p-q.

SUMMARY OF THE INVENTION

In view of the aforementioned drawbacks of the prior art, an object of the present invention is provide a thread cutting method which is capable of determining a cutting depth from the crest of thread in each thread cutting operation in the thread cutting cycle such that the cutting amount in each thread cutting operation can be less than and closest to the allowable cutting amount $S_p$, and which thereby enables wear of a tool to be reduced and the time required for the process to be shortened without deteriorating the thread cutting accuracy.

According to one aspect of the present invention, for achieving the objects described above, there is provided a thread cutting method in which a thread having a desired shape is obtained by repeatedly conducting thread cutting operations while changing a cutting depth from the crest of thread for the respective thread cutting operations, wherein the cutting depths for the thread cutting operations from the second thread cutting operation to the thread cutting operation at the cutting depth which corresponds to the bottom of thread are determined in sequence on the basis of the cutting depth for the first thread cutting operation and cutting amount at that cutting depth, the cutting depth at the bottom of thread and the cutting amount at that cutting depth, and the equation which expresses the relationship between the cutting depth from the crest of thread and the cutting amount, and in that the thread cutting operations are repeatedly conducted using the cutting depths including that for the first thread cutting operation.

The nature, principle and utility of the invention will become more apparent from the following detailed description when read in conjunction with the accompanying drawings.

BRIEF DESCRIPTION OF THE DRAWINGS

In the accompanying drawings:

FIG. 4 is a flowchart of the operation of the numerical control apparatus which is employed to carry out the thread cutting method according to the present invention.

DESCRIPTION OF THE PREFERRED EMBODIMENT

Figure 3:
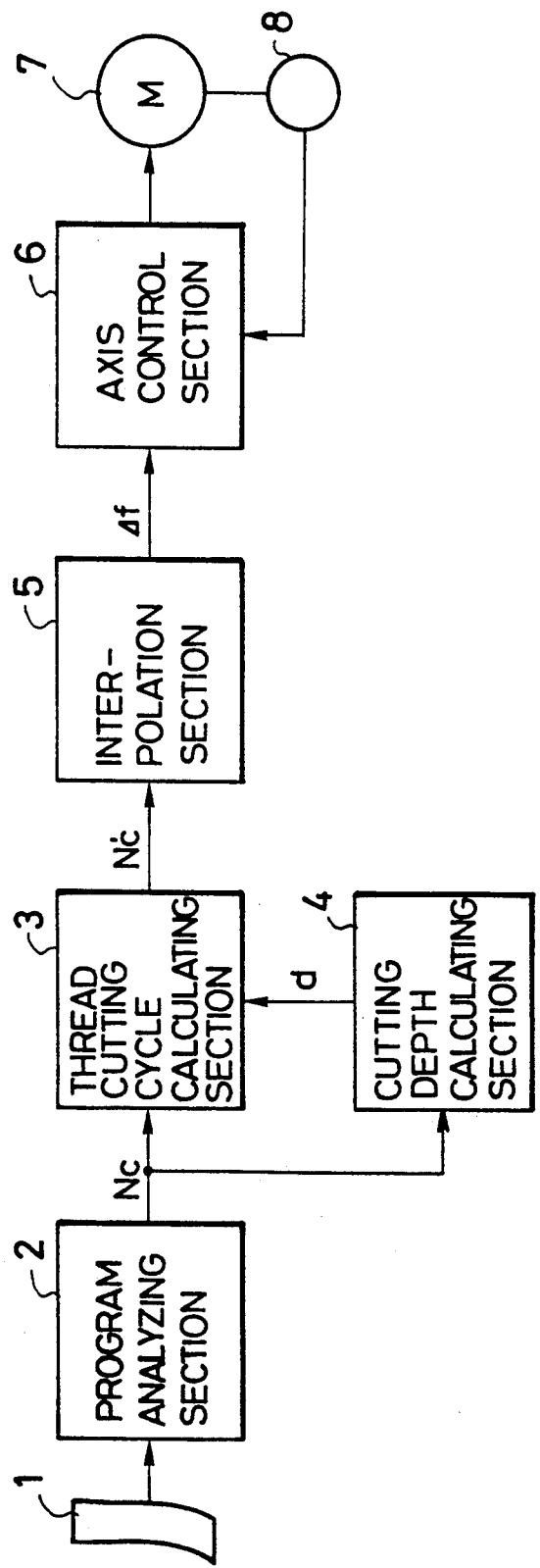
FIG. 3 is a block diagram of an embodiment of a numeral control apparatus which is employed to carry out the thread cutting method according to the present invention.

FIG. 3 is a block diagram of an embodiment of a numerical control apparatus which implements a thread cutting method according to the present invention.

A machining program 1 is input to an NC (numerical control) apparatus through a tape reader (not shown). Data representing the machining program 1 is read into a program analyzing section 2 for each block. The program analyzing section 2 analyzes the data which is sequentially read in for each block, and thereby calculates a first NC command value $N_c$. The first command value $N_c$ normally comprises a G code, the axis movement command, the command feed speed, the spindle rotational speed and so on. The first NC command value $N_c$ for the thread cutting cycle comprises a G code representing the thread cutting cycle, the height of crest of thread H, the cutting depth D from the crest of thread for the first thread cutting operation, the infeed U at the bottom of the thread, and so on. In this embodiment, commands are given from the machining program 1. However, the commands may also be given by means of switches on a panel which is not shown. The first NC command value $N_c$ calculated by the program analyzing section 2 is sent to a thread cutting cycle calculating section 3 and to a cutting depth calculating section 4. If the first NC command value $N_c$ contains the G code which represents the thread cutting process, the thread cutting cycle calculating section 3 calculates a second NC command value $N_c'$ which defines the thread cutting cycle on the basis of the cutting depth d from the crest of thread for each thread cutting operation in the thread cutting cycle, which is sent from the cutting depth calculating section 4, and sends the obtained second NC command value $N_c'$ to an interpolation section 5. In the case of the thread cutting cycle in which the thread cutting operation at a cutting depth which corresponds to the bottom of thread is conducted in the Nth thread cutting operation, N second NC command value $N_c'$ which define the thread cutting process, starting with the first thread cutting operation and ending with the Nth thread cutting operation, are calculated on the basis of the first NC command value $N_c$ which commands the thread cutting cycle. The interpolation section 5 calculates an amount which an axis moving amount $\Delta f$ per unit time on the basis of the second NC command value $N_c'$, and sends the calculated axis moving amount $\Delta f$ to an axis control section 6. The axis control section 6 drives an axis motor 7 under a feedback control which employs a position detector 8 to perform the thread cutting cycle shown in FIG. 1.

Next, an example of a method of calculating the cutting depth d from the crest of thread in each thread cutting operation in the thread cutting cycle by the cutting depth calculating section 4 will be described below using the flowchart of FIG. 4. In this embodiment, it is assumed that the relationship between the allowable cutting amount $S_p$ and the cutting depth d from the crest of thread in each thread cutting operation is given by the equation (6). In a case where the relationship between the allowable cutting amount $S_p$ and the cutting depth d is given by the equation (7), the cutting depth can also be calculated in the same manner, so that a separate description thereof has been omitted.

Figure 1:
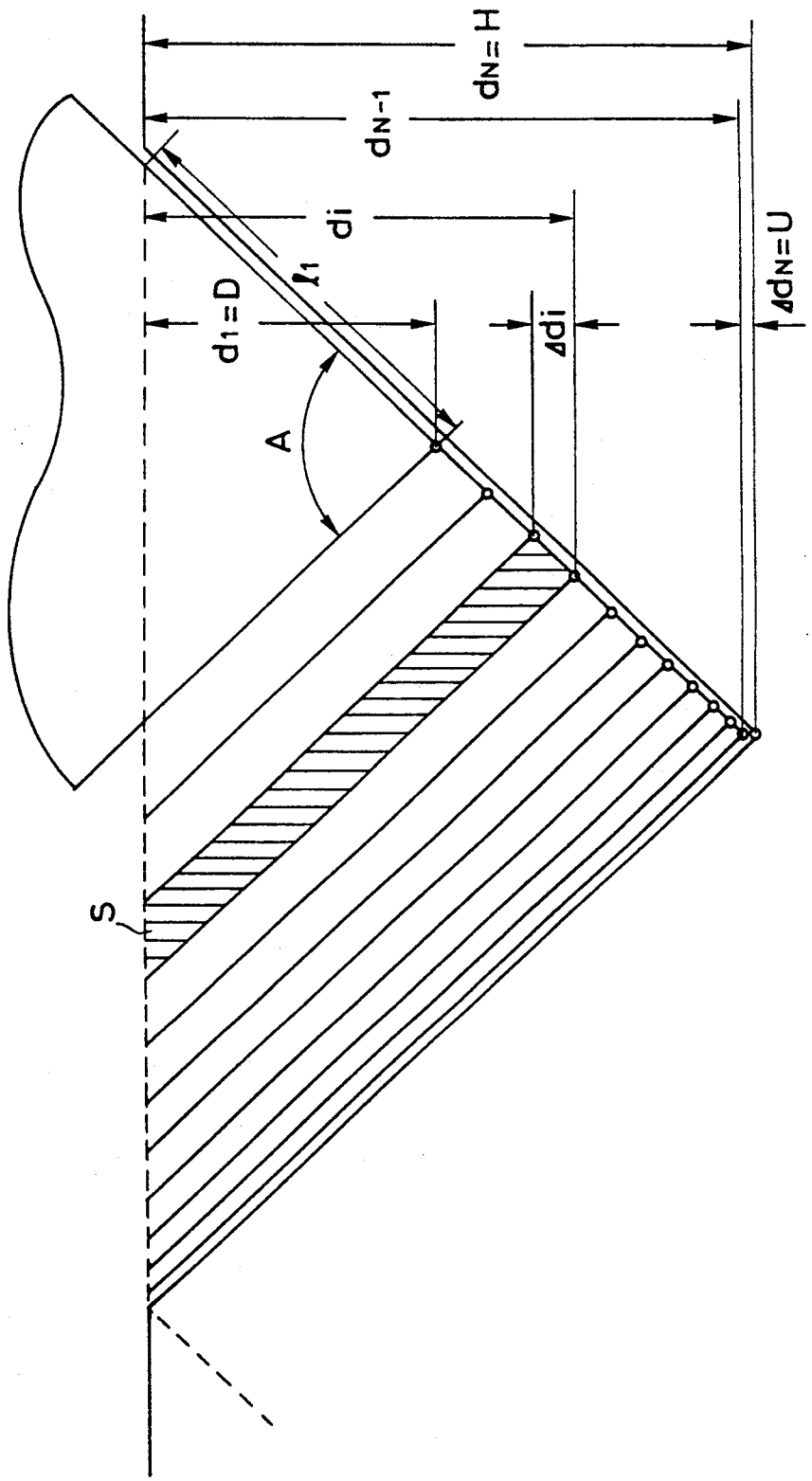
FIG. 1 illustrates an example of a thread cutting cycle.
Figure 2:
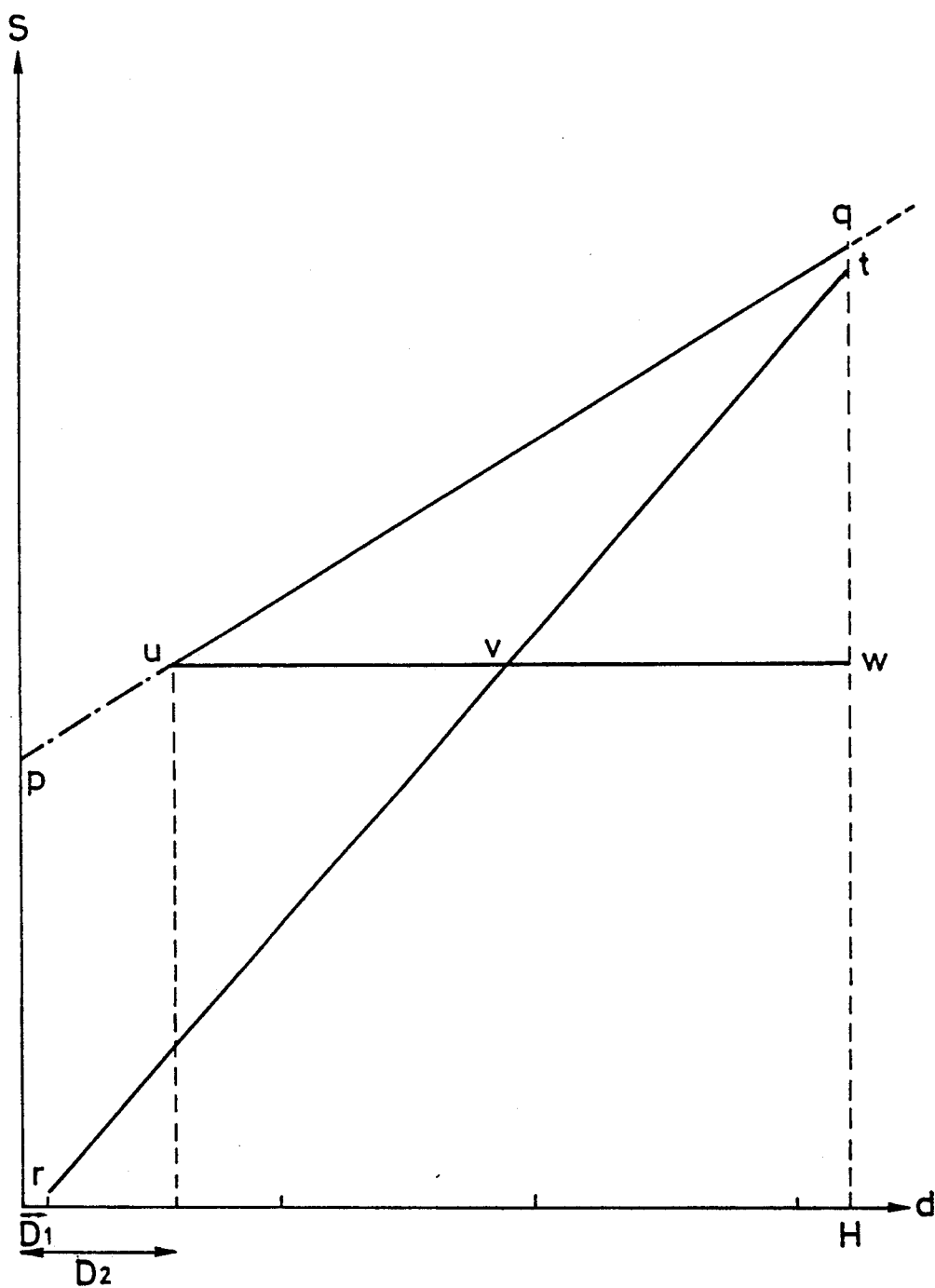
FIG. 2 is a graph showing the relationship between the cutting depth d from the crest of thread and the cutting amount S, obtained in various cutting methods.

First, the cutting amount $S_1$ in the first thread cutting operation in which the cutting depth is $d_1$ is calculated (Step S1)

$$S_1 = kD^2 \tag{8}$$

where k is a constant which is given by $$k = \tan(A/2) \tag{9}$$

if the angle of the cutting blade (the angle of thread) is A, as shown in FIG. 1. The letter D corresponds to the cutting depth $d_1$ for the first thread cutting operation which is contained in the first NC command value $N_c$. Next, assuming that the thread cutting at a cutting depth corresponding to the bottom of thread is performed in the Nth thread cutting operation, the cutting amount $S_N$ in the Nth thread cutting operation in which the cutting depth is $d_N$ is calculated (Step S2).

$$S_N = k\{H^2 - (H-U)^2\} \tag{10}$$

H and U respectively correspond to the height of crest of thread and the infeed at the bottom of thread, which are contained in the first NC command value $N_c$, as shown in FIG. 1. Hence, the cutting depth $d_N$ in the Nth thread cutting operation is H, and the cutting depth $D_{N-1}$ in the thread cutting operation immediately before the thread cutting operation at a depth corresponding to the bottom of thread is (H−U). Also, since the cutting depth in the first thread cutting operation and in the Nth thread cutting operation is respectively D and H, we have the following simultaneous equations from the equations (8) and (10).

$$\left. \begin{array}{l} a_1 D + b_1 = KD^2 \\ a_1 H + b_1 = k(2HU - U^2) \end{array} \right\} \tag{11}$$

From the simultaneous equation (11), the constant $a_1$ in the equation (6) is given by $$a_1 = k \frac{2HU - U^2 - D^2}{H - D} \tag{12}$$

(Step S3), and from the simultaneous equation (11), the constant $b_1$ in the equation (6) is given by $$b_1 = k\left(D^2 - \frac{2HU - U^2 - D^2}{H - D} \cdot D\right) \tag{13}$$

(Step S4).

The cutting amount $S_i$ in an arbitrary ith thread cutting operation between the first and Nth thread cutting operations in the thread cutting cycle ($1 < i < N$) is given by $S_i = k\{d_i^2 - d_{i-1}^2\}$, if the cutting depth in the ith thread cutting operation is $d_i$. Since the cutting amount $S_i$ should be less than and closest to the allowable cutting amount $S_{pi}$, we have from the equation (6), $$k\{d_i^2 - d_{i-1}^2\} = a_1 d_i + b_1 \tag{14}$$

Hence, $$d_i = \tfrac{1}{2} \cdot \left( a_1 + \sqrt{a_1 - 4(-b_1 - d_{i-1}^2)} \right) \tag{15}$$

Substituting $a_1$ and $b_1$ obtained in the Steps S3 and S4 for the equation (15), we have $$d_i = \tfrac{1}{2} \cdot \left\{ \frac{2HU - U^2 - D^2}{H - D} + \left( \sqrt{\frac{2HU - U^2 - D^2}{H - D}}^2 - 4\left( \frac{2HU - U^2 - D^2}{H - D} \cdot D - D^2 - d_{i-1}^2 \right) \right) \right\} \tag{16}$$

which means that the cutting depth $d_i$ in the ith thread cutting operation can be calculated on the basis of the cutting depth $d_{i-1}$ in the (i−1)th thread cutting operation. The equation (16) indicates that the cutting amount $S_i$ in an arbitrary thread cutting operation between the second and (N−1)th thread cutting operations can be made less than and closest to the allowable cutting amount $S_p$ by determining the cutting depth D in the first thread cutting operation such that the cutting amount $S_1$ in the first thread cutting operation, calculated by the equation (8), is less than and closest to the allowable cutting amount $S_p$ when the cutting depth is D and by determining the infeed U in the Nth thread cutting operation such that the cutting amount $S_N$ in the Nth thread cutting operation, calculated by the equation (16), is less than and closest to the allowable cutting amount $S_p$ when the cutting depth is H. In this embodiment, the cutting amount $S_i$ in the first thread cutting operation is calculated by assigning the cutting depth D to the cutting depth in the first thread cutting operation, and the cutting amount $S_N$ at the cutting depth which corresponds to the bottom of thread is calculated by assigning the infeed U to the cutting amount at the bottom of thread. However, the cutting amount $S_N$ at a cutting depth corresponding to the bottom of thread may be directly assigned.

Once the equation (16) has been defined by the processings from the Steps S1 to S4, "0" is assigned to the cutting depth $d_{i-1}$ (Step S5), and the cutting depth $d_i$ for the ith thread cutting operation, i.e., the cutting depth $d_1$ for the first thread cutting operation, is then calculated by inserting the cutting depth $d_{i-1}$ in the equation (16) (Step S6). Once the cutting depth $d_i$ for the ith thread cutting operation has been calculated, the cutting depth $d_{i-1}$ for the (i−1)th thread cutting operation is assigned to the cutting depth $d_i$, and then the cutting depth $d_i$ is calculated in a similar manner. Thereafter, the processing of the Step S6 is repeated until the cutting depth $d_i$ for the (N−1)th thread cutting operation is calculated. Once the thread cutting operation immediately before the thread cutting operation at a cutting depth which corresponds to the bottom of thread, i.e., the (N−1)th thread cutting operation, has been conducted, the processing of the Step S6 is suspended (Step S7), and the height of crest of thread H is assigned to the cutting depth $d_N$ for the Nth thread cutting operation, thereby completing the operation (Step S8). Whether the thread cutting cycle has reached an (N−1)th operation can be checked in the Step S7 by checking whether the following equation holds.

$$d_i = H - U \qquad (17)$$

However, the cutting depth $d_{N-1}$ obtained for the (N−1)th thread cutting operation may have a fraction, and the equation (17) may thus not be satisfied. In that case, the cutting depth $d_{N-1}$ for the (N−1)th thread cutting operation may be forcibly made equal to (H−U), i.e., the fraction may be erased in the calculation of the cutting depth $d_{N-1}$ for the (n−1)th thread cutting operation. Alternatively, the fractions may be erased beforehand in the calculation of the cutting depth of cut for the thread cutting operations ranging from the second to (N−2)th operations so that the following equation can hold.

$$d_{N-1} = H - U \qquad (18)$$

As will be understood from the foregoing description, in the thread cutting method according to the present invention in which a thread having a desired shape is obtained by repeatedly conducting the thread cutting operations while changing the cutting depth from the crest of thread for the respective thread cutting operations, the cutting depths for the thread cutting operations from the second thread cutting operation to the thread cutting operation at a cutting depth which corresponds to the bottom of thread are determined on the basis of the cutting depth for the first thread cutting operation and the cutting amount at that cutting depth, the cutting depth at the bottom of thread and the cutting amount at that cutting depth, and the equation which expresses the relationship between the cutting depth from the crest of thread and the cutting amount, and the thread cutting operations are repeatedly conducted using the cutting depth including that for the first thread cutting operation. In this way, the cutting amount in each of the thread cutting operations including the first thread cutting operation can be made less than and closest to the allowable cutting amount in each thread cutting operation by respectively determining as the cutting amount in the first thread cutting operation and the cutting amount at a cutting depth which corresponds to the bottom of thread the values which are less than and closest to the allowable cutting amount obtained at the two cutting depths. In consequence, wear of the tool can be reduced and the time required for the thread cutting process can be shortened while the thread cutting accuracy can be maintained high.

Figure 5:
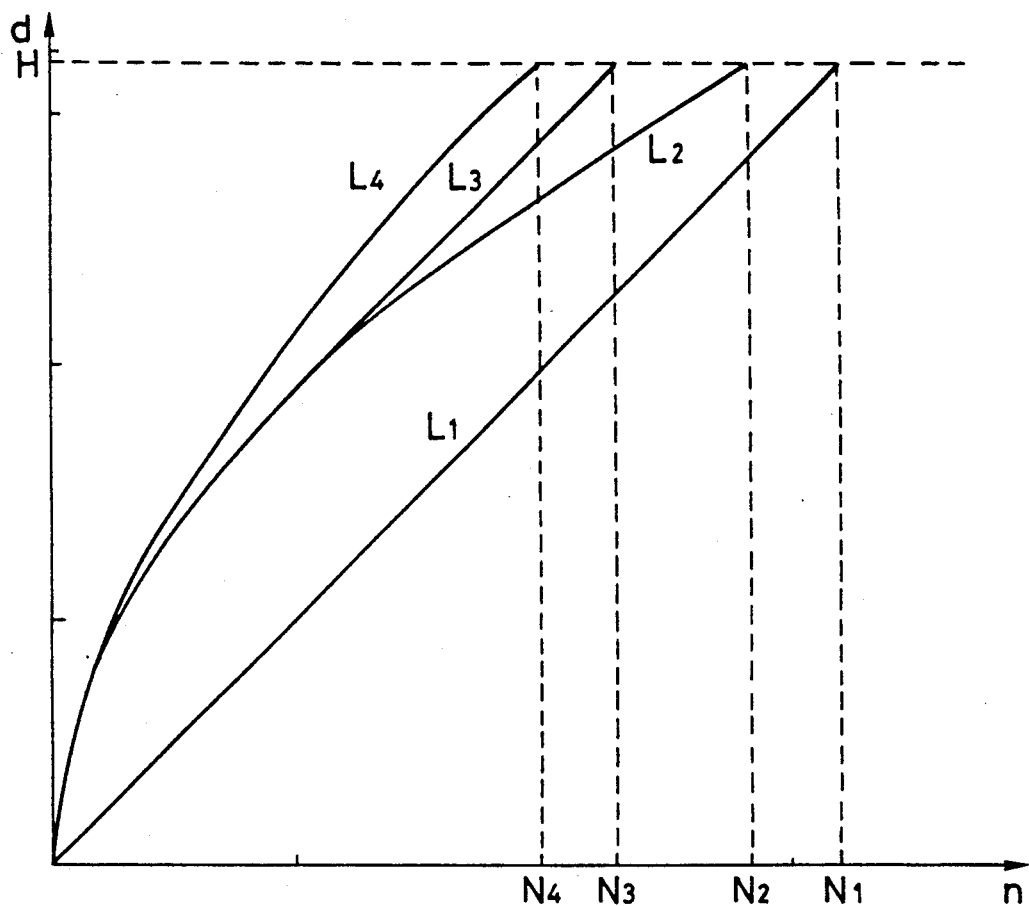
FIG. 5 is a graph showing the relationship between the number of times n the thread cutting operations are conducted and the cutting depth d from the crest of thread, obtained in various thread cutting methods.

FIG. 5 is a graph showing the relationship between the number of times n the thread cutting operations are conducted in one thread cutting cycle and the cutting depth d from the crest of thread. $L_1$ represents the relationship between the number of times n the thread cutting operations are conducted and the cutting depth d in the equal depth cutting method, $L_2$ represents the relationship obtained by the first thread cutting method, $L_3$ represents the relationship obtained by the second thread cutting method, and $L_4$ represents the relationship obtained in the present invention. H represents the height of thread. $N_1$ indicates the number of times the thread cutting operations are conducted in the equally cutting method by the time the cutting depth d is increased to the height of crest of thread H, i.e., by the time the thread cutting cycle is completed, and $N_2$, $N_3$ and $N_4$ respectively indicate the number of times the thread cutting operations are conducted in the first thread cutting method, the second thread cutting method and the thread cutting method according to the present invention. As can be seen in FIG. 5, $N_4 < N_3 < N_2 < N_1$, which means that the thread cutting method according to the present invention is capable of conducting the thread cutting process at a higher speed than any conventional thread cutting method. Table 1 is a list of number of times $N_1$, $N_2$, $N_3$ and $N_4$ the thread cutting operations are conducted in the above-described types of thread cutting methods. In this example, the height of crest of thread H was 3.25 mm, the cutting depth D for the first thread cutting operation was 0.6 mm, and the infeed U at a cutting depth corresponding to the bottom of thread was 0.1 mm.

TABLE 1

| Type of thread cutting method | Number of times the thread cutting operations are conducted |
|---|---|
| Equal depth cutting method | 33 times |
| First thread cutting method | 30 times |
| Second thread cutting method | 24 times |
| Thread cutting method according to the present invention | 21 times |

As can be seen from Table 1, the time required for the thread cutting process can be shortened by the thread cutting method according to the present invention.

It should be understood that many modifications and adaptations of the invention will become apparent to those skilled in the art and it is intended to encompass such obvious modifications and changes in the scope of the claims appended hereto.

What is claimed is:

1. A thread cutting method in which a thread having a desired shape is obtained by repeatedly conducting thread cutting operations while changing a cutting depth from the crest of thread for the respective thread cutting operations so as to be less than and closest to a predetermined allowable cutting amount; wherein the cutting depths for the thread cutting operations from the second thread cutting operation to the thread cutting operation at the cutting depth which corresponds to the bottom of thread are determined in sequence in accordance with a predetermined cutting depth for the first thread cutting operation and a cutting amount at that cutting depth, and a predetermined cutting depth at the bottom of thread and the cutting amount at that cutting depth, and the equation $S = a \times d + b$ which expresses the relationship between the cutting depth from the crest of thread and the cutting amount, and in that the thread cutting operations are repeatedly conducted using the cutting depths including that for the first thread cutting operation, d being the cutting depth from the crest of thread and S being the cutting amount and a and b being constants.

2. A thread cutting method in which a thread having a desired shape is obtained by repeatedly conducting thread cutting operations while changing a cutting depth from the crest of thread for the respective thread cutting operations so as to be less than and closest to a predetermined allowable cutting amount; wherein the cutting depths for the thread cutting operations from the second thread cutting operation to the thread cutting operation at the cutting depth which corresponds to the bottom of thread are determined in sequence in accordance with a predetermined cutting depth for the first thread cutting operation and a cutting amount at that cutting depth, and a predetermined cutting depth at the bottom of thread and the cutting amount at that cutting depth, and the equation $S = a \times d^2 + b$ which expresses the relationship between the cutting depth from the crest of thread and the cutting amount, and in that the thread cutting operations are repeatedly conducted using the cutting depths including that for the first thread cutting operation, d being the cutting depth from the crest of thread and S being the cutting amount and a and b being constants.

3. A thread cutting cycle generating apparatus comprising:
a means for calculating a cutting depth for each thread cutting operation from a first cutting depth from the crest of thread for the first thread cutting operation, a first cutting amount at said first cutting depth or a first command from which said first cutting amount is obtained, a second cutting depth from the crest of thread which corresponds to the bottom of thread, a second cutting amount at said second cutting depth or a second command from which said second cutting amount is obtained, and the equation which expresses the relationship between a third cutting depth from the crest of thread and a cutting amount at said third cutting depth, said first cutting depth and said second cutting depth being commanded for generating a thread cutting cycle in accordance with a thread cutting method in which a thread having a desired shape is obtained by repeatedly conducting thread cutting operations while changing a cutting depth from the crest of thread for the respective thread cutting operations so as to be less than and closest to a predetermined allowable cutting amount; wherein the cutting depths for the thread cutting operations from the second thread cutting operation to the thread cutting operation at the cutting depth which corresponds to the bottom of thread are determined in sequence in accordance with a predetermined cutting depth for the first thread cutting operation and a cutting amount at that cutting depth, and a predetermined cutting depth at the bottom of thread and the cutting amount at that cutting depth, and the equation $S = a \times d + b$ which expresses the relationship between the cutting depth from the crest of thread and the cutting amount, and in that the thread cutting operations are repeatedly conducted using the cutting depths including that for the first thread cutting operation, d being the cutting depth from the crest of thread and S being the cutting amount and a and b being constants.

4. A thread cutting cycle generating apparatus comprising:
a means for calculating a cutting depth for each thread cutting operation from a first cutting depth from the crest of thread for the first thread cutting operation, a first cutting amount at said first cutting depth or a first command from which said first cutting amount is obtained, a second cutting depth from the crest of thread which corresponds to the bottom of thread, a second cutting amount at said second cutting depth or a second command from which said second cutting amount is obtained, and the equation which expresses the relationship between a third cutting depth from the crest of thread and a cutting amount at said third cutting depth, said first cutting depth and said second cutting depth being commanded for generating a thread cutting cycle in accordance with a thread cutting method in which a thread having a desired shape is obtained by repeatedly conducting thread cutting operations while changing a cutting depth from the crest of thread for the respective thread cutting operations so as to be less than and closest to a predetermined allowable cutting amount; wherein the cutting depths for the thread cutting operations from the second thread cutting operation to the thread cutting operation at the cutting depth which corresponds to the bottom of thread are determined in sequence in accordance with a predetermined cutting depth for the first thread cutting operation and a cutting amount at that cutting depth, and a predetermined cutting depth at the bottom of thread and the cutting amount at that cutting depth, and the equation $S = a \times d^2 + b$ which expresses the relationship between the cutting depth from the crest of thread and the cutting amount, and in that the thread cutting operations are repeatedly conducted using the cutting depths including that for the first thread cutting operation, d being the cutting depth from the crest of thread and S being the cutting amount and a and b being constants.

* * * * *